US008756411B2

(12) United States Patent
Wei et al.

(10) Patent No.: US 8,756,411 B2
(45) Date of Patent: Jun. 17, 2014

(54) APPLICATION LAYER SECURITY PROXY FOR AUTOMATION AND CONTROL SYSTEM NETWORKS

(75) Inventors: Dong Wei, Edison, NJ (US); Livio Dalloro, Princeton, NJ (US); Yan Lu, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 172 days.

(21) Appl. No.: 13/310,825

(22) Filed: Dec. 5, 2011

(65) Prior Publication Data

US 2012/0144187 A1 Jun. 7, 2012

Related U.S. Application Data

(60) Provisional application No. 61/419,943, filed on Dec. 6, 2010.

(51) Int. Cl.
H04L 29/06 (2006.01)

(52) U.S. Cl.
USPC .......................................... 713/152; 713/151

(58) Field of Classification Search
USPC ................................................. 713/151–152
See application file for complete search history.

(56) References Cited

U.S. PATENT DOCUMENTS

| 2002/0026493 | A1* | 2/2002 | Scardamalia et al. | 709/213 |
|---|---|---|---|---|
| 2005/0120222 | A1* | 6/2005 | Mitsuoka et al. | 713/182 |
| 2008/0010536 | A1* | 1/2008 | Bates et al. | 714/38 |
| 2008/0095054 | A1* | 4/2008 | Morford | 370/231 |
| 2009/0059916 | A1* | 3/2009 | DeCusatis et al. | 370/389 |
| 2009/0150977 | A1* | 6/2009 | Carley | 726/3 |
| 2009/0183252 | A1* | 7/2009 | Nomi | 726/13 |
| 2010/0145532 | A1* | 6/2010 | Gregory et al. | 700/286 |
| 2010/0228970 | A1* | 9/2010 | Oka et al. | 713/156 |
| 2012/0131646 | A1* | 5/2012 | Chandolu et al. | 726/4 |

FOREIGN PATENT DOCUMENTS

EP     1 940 075 A1     7/2008

OTHER PUBLICATIONS

Bouchahda, A.; Nhan Le Thanh; Bouhoula, A.; Labbene, F., "RBAC+: Dynamic Access Control for RBAC-Administered Web-Based Databases," Emerging Security Information Systems and Technologies (SECURWARE), 2010 Fourth International Conference on , vol., no., pp. 135,140, Jul. 18-25, 2010.*
Bindiganavale, V.; Jinsong Ouyang, "Role Based Access Control in Enterprise Application—Security Administration and User Management," Information Reuse and Integration, 2006 IEEE International Conference on , vol., no., pp. 111,116, Sep. 16-18, 2006.*

(Continued)

*Primary Examiner* — Linglan Edwards
*Assistant Examiner* — Vu V Tran

(57) ABSTRACT

Embodiments provide an application layer security proxy that protects substation automation systems. The application layer security proxy inspects a received, inbound data packet at the application layer, and either drops the data packet, forwards the data packet, or processes the data packet rather than dropping it in order to maintain the communications network connection, the later two according to a predefined role-based access control policy. The application layer security proxy calculates a round trip time for each reply to a received, inbound data packet and observes the bandwidth usage from the amount of bytes transmitted. Round trip time and bandwidth usage are used to detect abnormal communication traffic.

15 Claims, 13 Drawing Sheets

(56) References Cited

OTHER PUBLICATIONS

Cheung H. et al; "Two-level network architecture for open-access power systems with distributed generations"; Power and Energy Society General Meeting—Conversion and Delivery of Electrical Energy in the 21st Century, IEEE, Piscataway; pp. 1-7; ISBN: 978-1-4244-1905-0; XP031304711; 2008; US; Jul. 20, 2008.

Klein S. A.; "A Secure IEC-61850 Toolkit for Utility Automation"; Conference for Homeland Security, Catch 09. Cybersecurity, Applications & Technology, IEEE, Piscataway;pp. 245-250; ISBN: 978-0-7695-3568-5; XP031444032; 2009; US; Mar. 3, 2009.

Hu Huozhen et al; "Solutions vor SCADA system communication reliability in photovoltaic power plants"; IEEE 6th International Power Electronics and Motion Control Conference, IPEMC, Wohan, China, IEEE, Piscataway; pp. 2482-2485; ISBN: 978-1-4244-3556-2; XP031535543; 2009; US; May 17, 2009.

European Search Report dated May 27, 2013.

\* cited by examiner

APPLICATION LAYER SECURITY PROXY FOR AUTOMATION AND CONTROL SYSTEM NETWORKS

CROSS REFERENCE TO RELATED APPLICATIONS

This application claims the benefit of U.S. Provisional Application No. 61/419,943, filed on Dec. 6, 2010, the disclosure which is incorporated herein by reference in its entirety.

BACKGROUND OF THE INVENTION

The invention relates generally to an application layer security proxy. More specifically, the invention relates to a strategy to protect against a Man-In-The-Middle (MITM) type of cyber attack at the application layer.

America's electrical power industry, in conjunction with its government, is developing Smart Grid technologies to improve electrical power efficiency and reliability. This move is creating challenges in transitioning originally isolated, proprietary systems to more open ones, connecting them to enterprise-level and other networks without compromising their original control performance.

There is an immediate need to solve cyber security issues prior to the occurrence of a U.S. energy catastrophe. More and more new components with great variety and complexity are being added to power grid automation systems. Components such as new protection equipment, Plug-in Electric Vehicle (PEV) adapters, and distributed generation and distribution, especially with the inclusion of greater amounts of renewable energy. In addition, enabling active participation by consumers in Demand Response (DR) will lead to a greater integration of Supervisory Control And Data Acquisition (SCADA) systems with Advanced Metering Infrastructures (AMI). The combination of these factors will increase the susceptibility of power grid automation systems to cyber attacks from many different sources.

The secure communications solutions deployed in the Information Technology (IT) world will not be applicable for Smart Grid systems. The reasons include: 1) heterogeneous communication protocols and platforms are used in the Smart Grid automation systems, 2) legacy systems without enough computational power or memory to perform security functionalities, 3) Smart Grid applications require different Quality-of-Service (QoS) in terms of delay, bandwidth, packet loss rate, etc., for data exchange, and 4) Smart Grid technologies are still rapidly evolving, new requirements for communication and cyber security will come together with new Smart Grid applications.

The application layer (layer 7) is the Open Systems Interconnection (OSI) layer closest to the end user, which means that both the application layer and the user interact directly with a software application. The application layer communication is the weakest link in terms of security.

The application layer supports many different protocols. Many of the protocols were not designed with security as a priority. Therefore, application layer protocols have vulnerabilities and provide many access points for attackers that make protection difficult. Additionally, application layer cyber attacks are attractive to attackers because the information they seek resides within the application itself and maximizes the impact of an attack.

Although application layer security issues have been addressed in the IT world, especially for web services and database applications, the unique challenges of Smart Grid applications have not been addressed.

FIG. 1 shows a current security solution used for substation 101 automation such as a Remote Terminal Unit (RTU) 103 and a Programmable Logic Controller (PLC) 105. Other ancillary devices may include a substation automation system 107, a log server 109 and a Human Machine Interface (HMI) 111 that communicate over a substation network 113 using an application layer communication protocol such as International Electrotechnical Commission (IEC) 61850 or Distributed Network Protocol 3 (DNP3). IEC 61850 is a reference architecture for electric power systems and DNP3 is a set of communication protocols used between components in process automation systems. The security solution is a firewall and Virtual Private Network (VPN) 115, 117 placed in the substation 101 to isolate the substation devices from the communications network 119. The firewall and VPN 115, 117 operate at the data link layer (layer 2), the network layer (layer 3) and the transport layer (layer 4). Security issues at the application layer are not addressed.

For example, for an operator in a control center 121 who is authorized to remotely access transmission protection relays at the substation 101 to read diagnostic information, the current security solution inspects data packets at layers 2, 3 and 4 by checking Internet Protocol (IP) addresses, port numbers, and protocols. The firewall and VPN 115, 117 do not prevent the operator from changing a protection relay setting which he is not authorized to perform.

FIG. 2 shows an Application-Level Gateway (ALG) 201 security solution. The ALG 201 resides in the substation 101 and separates the control devices from devices in other substations or in the control center 121. This solution assumes that the exposure point for potential hackers is not in the substation 101.

There are three shortcomings with the ALG 201 solution. First, internal cyber attacks, also called behind-the-firewall issues, (including "friendly fire") are ignored. For example, an automation engineer in the substation 101 that connects to the substation network is allowed access to the PLC 105 and HMI 111, but is not allowed to change any protection relay settings in the RTU 103. The automation engineer would be able to bypass the security ALG 201 and access the protection relays and change their settings since he is connecting to the substation network 113 internally. Second, there are scalability and performance issues. If there are thousands of Intelligent Electronic Devices (IEDs) in the substation 101, the access control list (white list), which lists which IEDs may be accessed by an individual in the substation 101 is large. Each data packet the substation 101 ALG 201 receives from an outside source has to be examined against the white list and would lead to large time delays which may degrade real-time control performance. And third, a single point of failure issue. The entire substation 101 automation system would be compromised if the ALG 201 were compromised.

There is a need for a distributed application layer security proxy to provide a security solution for substation automation.

SUMMARY OF THE INVENTION

The inventors have discovered that it would be desirable to have an application layer security proxy to protect substation automation systems. The application layer security proxy inspects an inbound data packet at the application layer, and either drops the data packet, forwards the data packet, or processes the data packet rather than dropping it in order to maintain the communications network connection, the later two according to a predefined role-based access control policy. The application layer security proxy calculates a round trip time for each reply to a received, inbound data packet and observes the bandwidth usage from the amount of bytes transmitted. Round trip time and bandwidth usage are used to detect abnormal communication traffic.

One aspect of the invention provides a method for protecting a substation device that receives operation commands over an Internet Protocol (IP) communications network. Methods according to this aspect of the invention comprise receiving an inbound data packet that contains an operation command for the device, decrypting the layer 7 (application layer) data into a predetermined communication protocol, comparing the operation command with a Role-Based Access Control (RBAC) comprising, if the operation command is authorized by the RBAC, the operation command is reassembled into a data packet according to the application layer communication protocol, and if the operation command is not authorized by the RBAC, the operation command is changed to an invalid operation command for the device and reassembled into a data packet according to the application layer communication protocol.

Another aspect of the invention comprises timestamping the received, inbound data packet, calculating a Round-Trip Time (RTT) for the received, inbound data packet, wherein the RTT is computed as the time difference between the received, inbound data packet and its subsequent acknowledgement data packet, reading an Intrusion Detection Profile (IDP), wherein the IDP specifies an RTT range for the inbound, received data packet's source port, and if the received, inbound data packet's RTT is not within the IDP RTT range, generating an alarm event.

Another aspect of the invention comprises reading the size of the received, inbound data packet, calculating a bandwidth usage for the received, inbound data packet, wherein the bandwidth usage is computed as the volume of data in the data packet in bytes, reading an Intrusion Detection Profile (IDP), wherein the IDP specifies a bandwidth usage range for the inbound, received data packet's source port, and if the received, inbound data packet's bandwidth is not within the IDP bandwidth usage range, generating an alarm event.

Another aspect of the invention comprises receiving an inbound data packet that contains an operation command for the device, comparing the layer 2 header MAC addresses, IP addresses, port numbers and protocol number with an access control list, if there is a disparity between the layer 2 header MAC addresses, IP addresses, port numbers or protocol number, and the access control list, dropping the data packet, comparing the layer 3 header source address, destination address and protocol number with the access control list, if there is a disparity between the layer 3 header source address, destination address or protocol number, and the access control list, dropping the data packet, comparing the layer 4 header sequence number and acknowledgement number with a connection status, if the layer 4 sequence number or acknowledgement number does not conform with the connection status, dropping the data packet, decrypting the layer 7 (application layer) data into a predetermined communication protocol, comparing the application layer data sequence number with an expected application layer sequence number, if the application layer data sequence number does not conform with the expected application layer sequence number, dropping the data packet, comparing the operation command with a Role-Based Access Control (RBAC) comprising, if the operation command is authorized by the RBAC, the operation command is reassembled into a data packet according to the application layer communication protocol, and if the operation command is not authorized by the RBAC, the operation command is changed to an invalid operation command for the device and reassembled into a data packet according to the application layer communication protocol.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The teems "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and security proxy may be implemented in software or hardware.

Embodiments of the invention provide a security proxy, methods and computer-usable media storing computer-readable instructions that provide a security solution for substation Intelligent Electronic Devices (IEDs) that receive operation commands over a communications network. Embodiments provide an application layer security proxy. The invention may be deployed as software as an application program tangibly embodied on a program storage device. The application code for execution can reside on a plurality of different types of computer readable media known to those skilled in the art.

Figure 1:
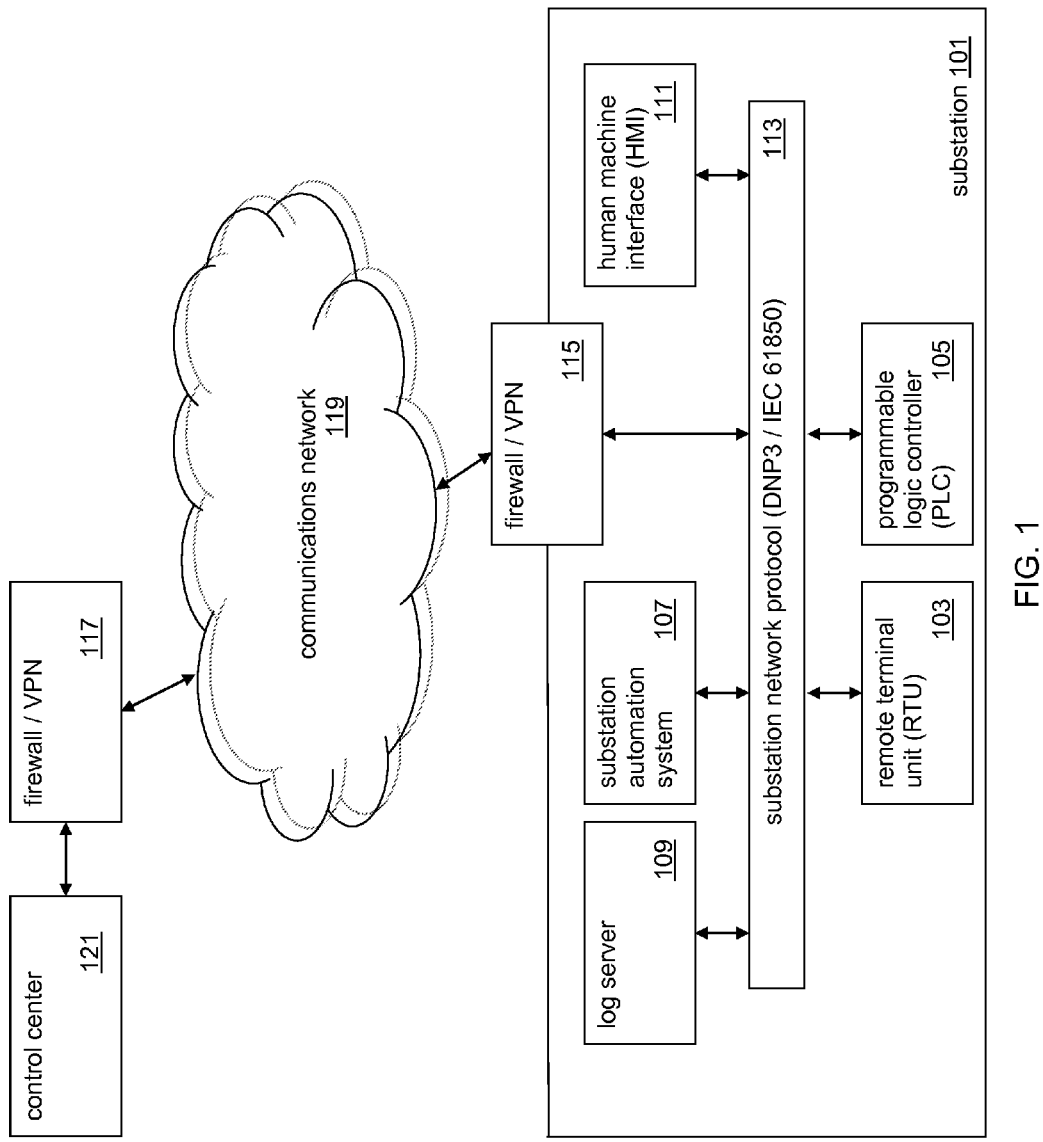
FIG. 1 is an exemplary substation security solution employing a firewall and Virtual Private Network (VPN).
Figure 2:
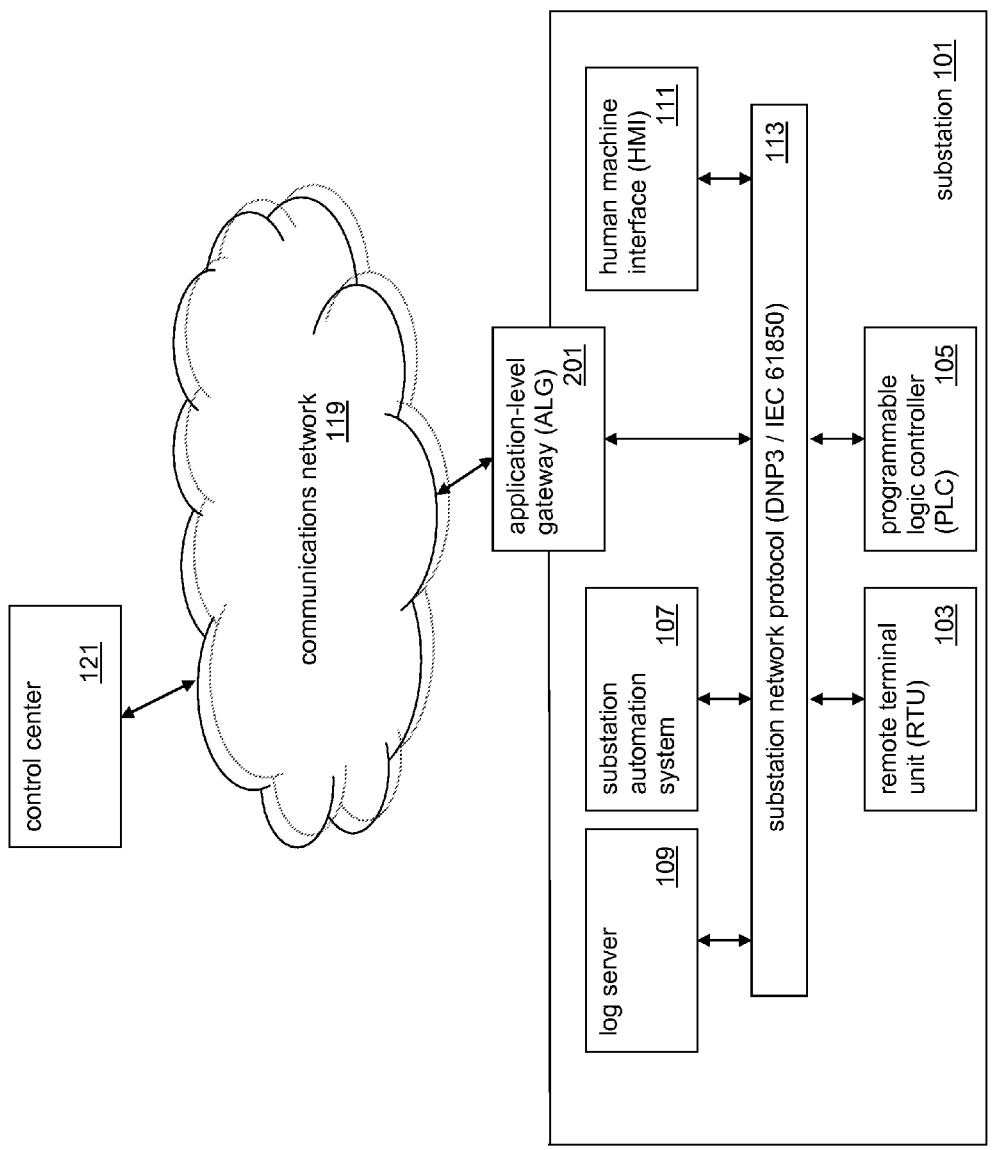
FIG. 2 is an exemplary substation security solution employing an Application-Level Gateway (ALG).
Figure 3:
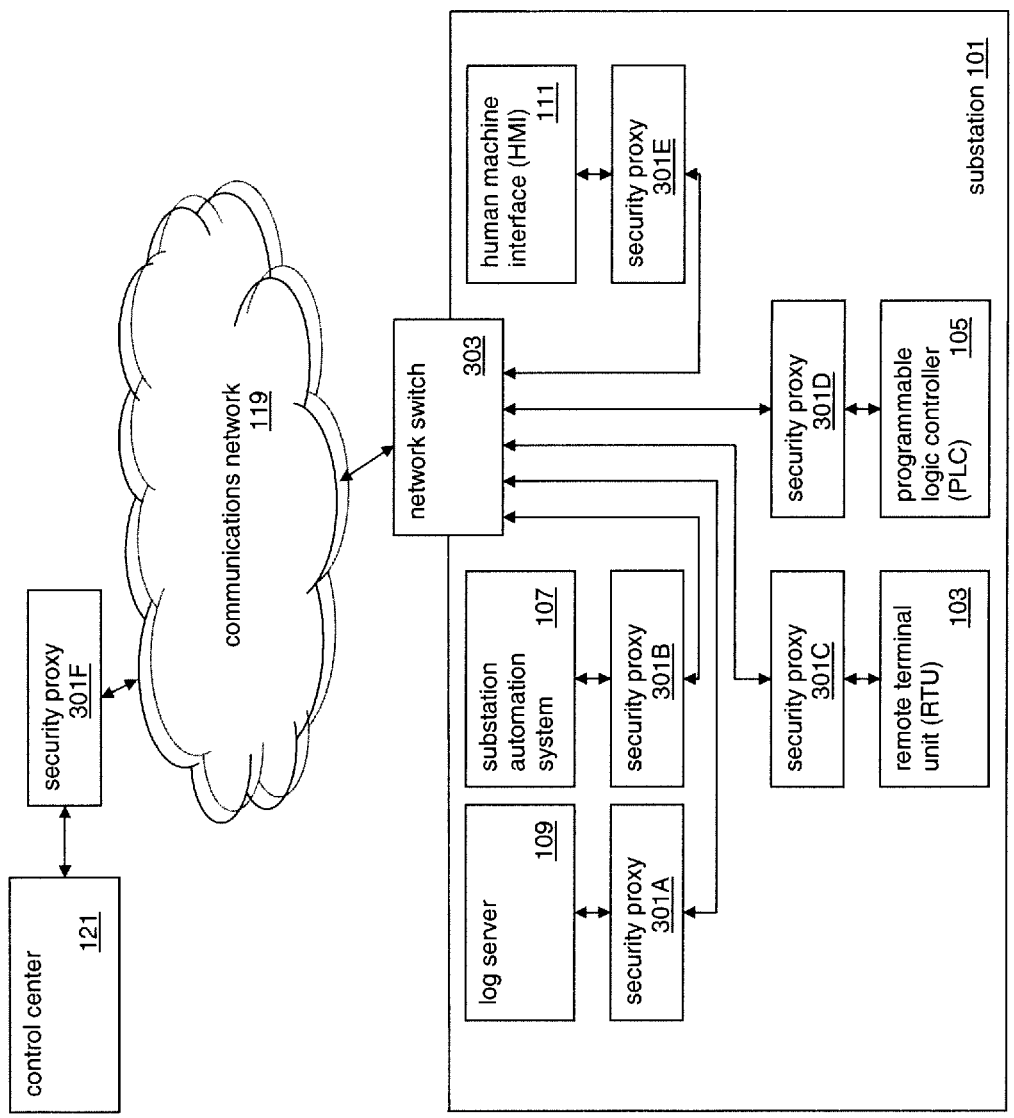
FIG. 3 is an exemplary substation security solution employing an application layer security proxy.

FIG. 3 shows an embodiment that provides security for the application layer. Cyber attacks may come from Man-In-The-Middle (MITM) attacks (hackers who have access to public communications networks which connect electrical grid control centers and substations) and friendly-fire attacks (professionals in a control center who are allowed to remotely access some, but not all devices in a substation).

FIG. 3 includes security proxies (policies) 301A, 301B, 301C, 301D, 301E and 301F (collectively 301) and a network switch 303. A security proxy 301 couples to the input port of a device (IED, PLC, RTU or other) which requires security protection and separates it from the communications network 119 and other devices in the substation 101. A security proxy 301 functions as a security enforcement device which provides packet monitoring, role-based access control, intrusion detection, and logging and alarming for a specific device. The network switch 303 is an intermediate network device that processes and forwards data packets at layer 2.

Figure 4:
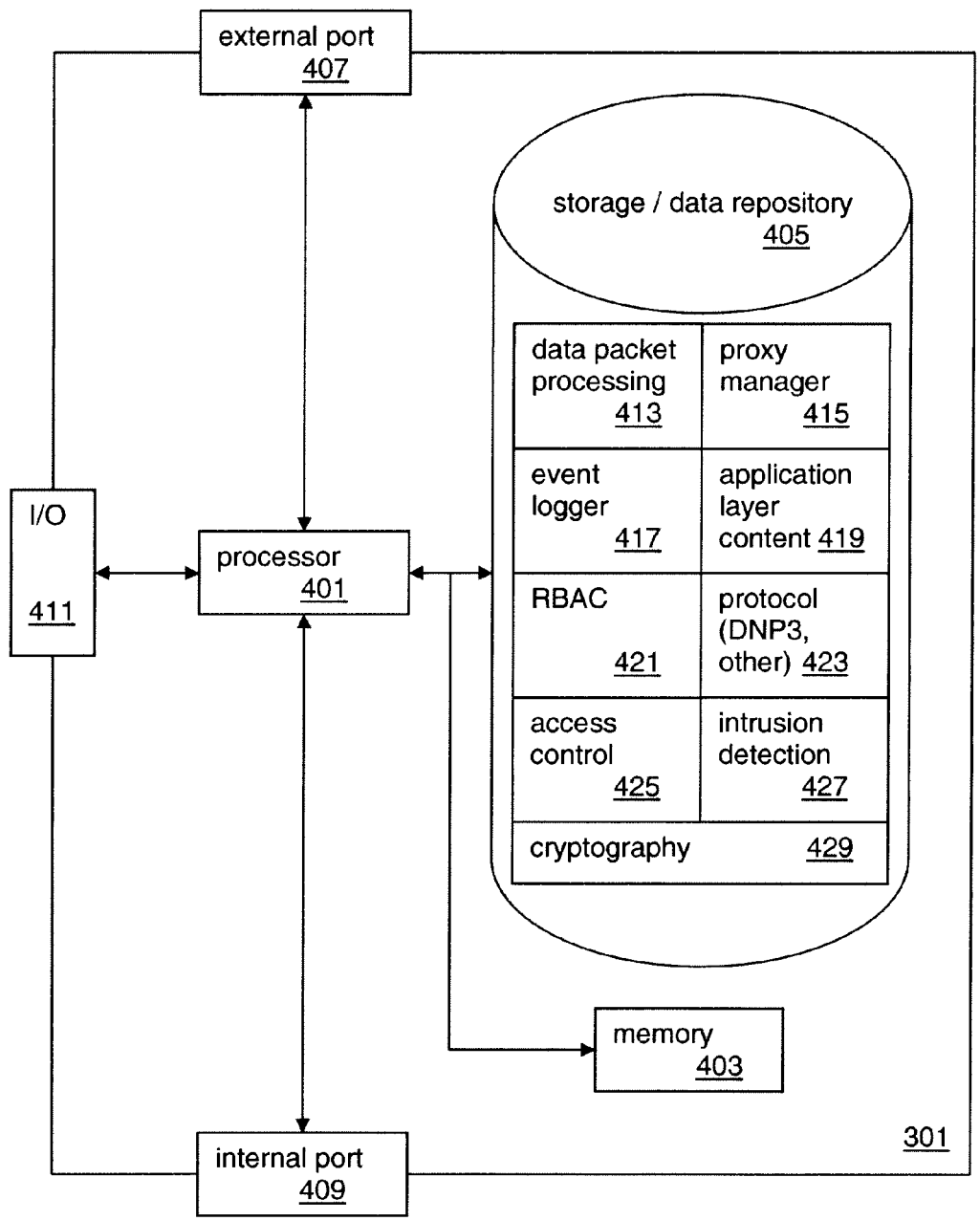
FIG. 4 is an exemplary application layer security proxy.

FIG. 4 shows the security proxy 301. The security proxy 301 comprises a run-time system with run-time components operating in parallel and with threads. The security proxy 301 framework processes inbound and outbound data packets and may be implemented as a computer that includes a processor 401, memory 403, storage 405, software and other components. The processor 401 is coupled to a communications network external port 407, an internal port 409, memory 403 and storage 405 and controls the overall operation of the computer by executing instructions defining a security proxy configuration for a specific device. The instructions may be stored in the storage 405, and loaded into the memory 403 when executing the configuration. The invention may be implemented as an application defined by the computer program instructions stored in the memory 403 and/or storage 405 and controlled by the processor 401 executing the computer program instructions. I/O 411 allows for user interaction with the computer via peripheral devices such as a display, a keyboard, a pointing device, and others.

The run-time components comprise data packet processing 413, a proxy manager 415, an event logger 417, application layer content processing 419, Role-Based Access Control (RBAC) 421, a substation communications protocol adapter (DNP3 shown) 423, access control processing 425, intrusion detection 427 and cryptography 429.

The data packet processing 413 receives inbound data packets from the communications network 119 and outbound data packets from the device coupled the security proxy's 301 internal port 409. Each data packet includes headers for layers 2 through 7. Typically, layers 5 and 6 are not used in substation automation communication for legacy systems. Secure Sockets Layer (SSL), which is an encryption/decryption protocol, is used at layer 5. Layer 5 data may be retrieved from a layer 4 packet and parsed to layer 6 or layer 7 directly. The data packet processing 413 retrieves the application layer data from the data packet. If the RBAC 421 requires that the application layer data change, data packet processing 413 reassembles and generates a new data packet that includes a new layer 2 header, a new layer 3 header, and a new layer 4 header to make those headers consistent with the application layer data. Each lower layer (layers 2, 3 and 4) has a checksum to verify that the data packet is not corrupted (damaged) during transmission. Each checksum is calculated by its layer header and the application layer data. If the application layer data changes, each lower layer header checksum must be recalculated.

The proxy manager 415 manages an Address Resolution Protocol (ARP) table and routing table at layer 2. The event logger 417 manages predetermined events generated by the security proxy 301. The application layer content processing 419 translates application layer data into operation commands such as read, write, reset, etc., according to the application layer communication protocol adapter 423 (DNP3, IEC 61850, and others).

The RBAC 421 specifies who is authorized to access the device that the security proxy 301 is coupled to and what operations they are authorized to perform. For example, a user may use the HMI 111 to perform read/write/reset/reboot operations on the PLC 105 in accordance with the RBAC 421 for security proxy 301D. The communication protocol adapter 423 (in the following examples, DNP3) translates a DNP3 data packet using standard DNP3 communication protocol into data the application layer content processing 419 can understand. DNP3 may be replaced by IEC 61850 if the application layer communication protocol is IEC 61850. The access control processing 425 provides layer 2, layer 3 and layer 4 access controls according to addresses, port number, etc. The intrusion detection 427 observes data exchange patterns such as a round trip time reply in response to a received, inbound data packet and the bandwidth to send traffic to and from the protected device. For example, security proxy 301C calculates a round trip time and bandwidth usage to and from the RTU 103. The cryptography 429 performs data packet encryption and decryption.

A security proxy 301 inspects each received, inbound data packet at the application layer according to the security proxy's 301 RBAC 421. A security proxy 301 protects its downstream device by either, 1) dropping the received, inbound data packet, 2) forwarding the received, inbound data packet, or 3) changing the application layer data of the received, inbound data packet and forwarding it.

A security proxy 301 manages multi-user access, monitors data communication at the application layer and detects application layer attack. An application layer attack may be detected if an application layer operation command violation is detected.

For example, according to a specific role, a user may only be authorized to read the status of a transformer (not shown) via the RTU 103 during operation. However, if the user forwards a command to the RTU 103 to change the transformer tap-changer and thereby change the transformer output voltage, the security proxy 301C receives the inbound data packet containing the operation command, retrieves the application layer operation command, and in accordance with the security proxy's 301C RBAC 421, regards the user's command as an application layer attack. The security proxy 301C records all security related activities and forwards alarm events to a predetermined HMI.

The exposure point of a communications network 119 to hackers is at external ports that either, 1) couple to the communications network 119, or 2) couple between a network switch 303 and a security proxy 301 within a substation 101. At an internal port 409, between a security proxy 301 and its protected device, there is no exposure point to hackers.

Figure 5:
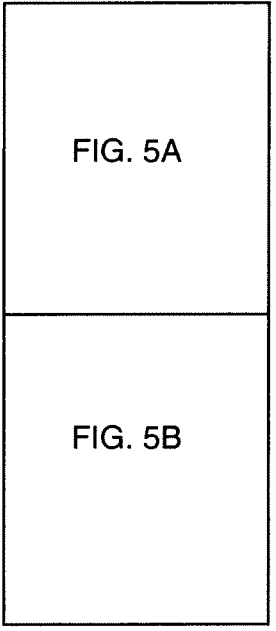
FIG. 5 is an exemplary security policy management method.
Figure 5A:
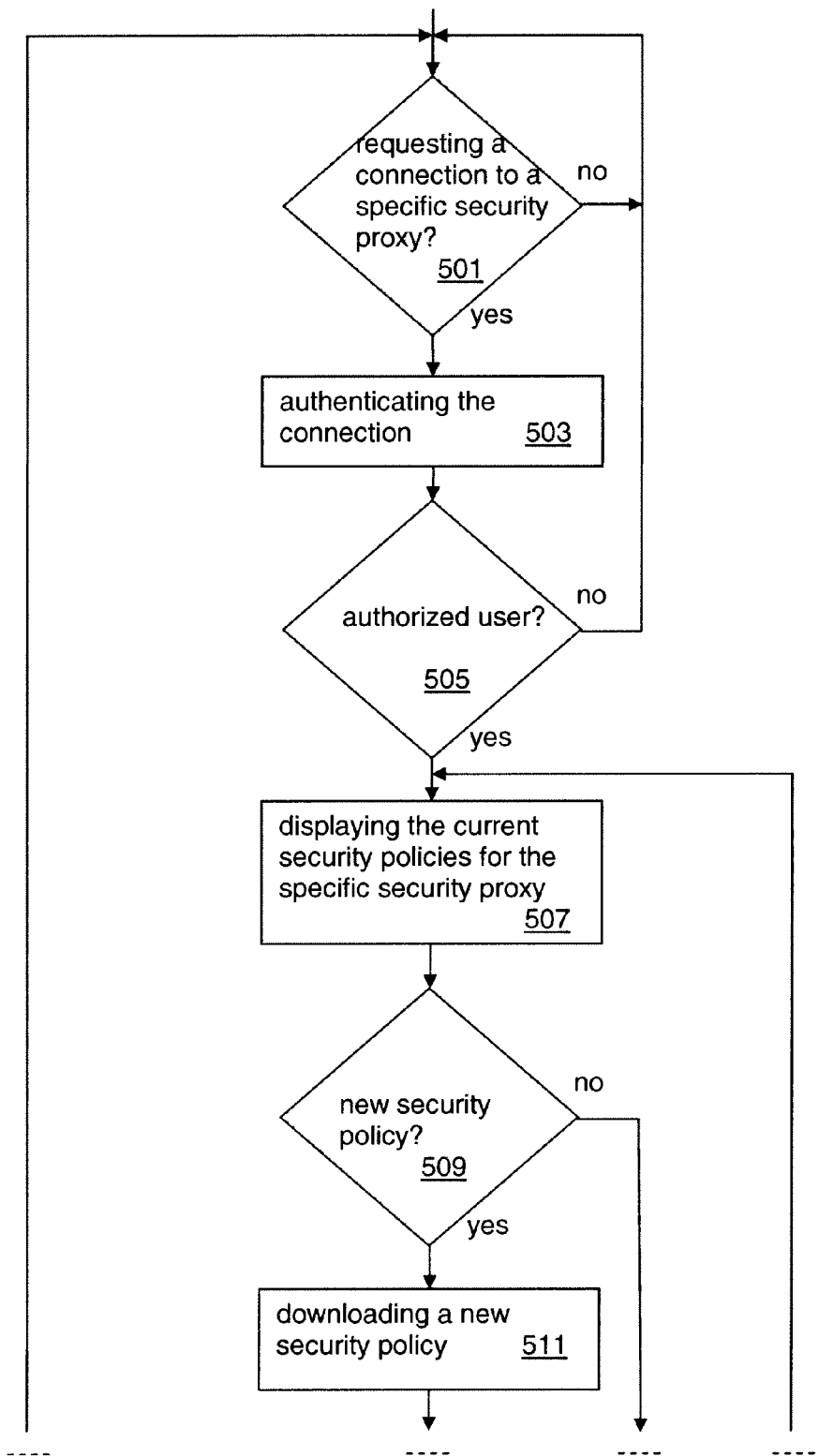
Figure 5B:
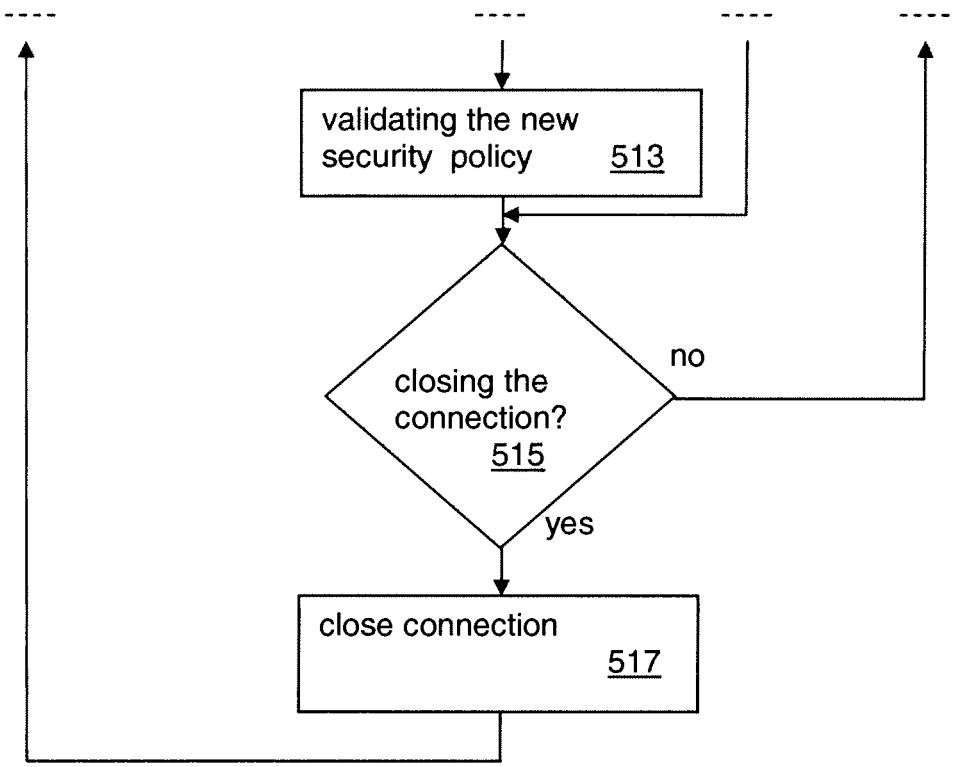

FIG. 5 shows a security policy management method for a security proxy 301. A user (security professional) in the control center 121 downloads, views, and modifies security proxy 301A, 301B, 301C, 301D, 301E security policy RBAC 421 configurations, each specifically tailored for a device 109, 107, 103, 105, 111 at the substation 101. Security policies include, 1) keys for cryptography, 2) which operations, such as read, write, reset, set, download, start, stop, etc., a specific user is authorized to perform, 3) which device is able to communicate with which device according to its layer 2 Media Access Control (MAC) address and its layer 3 IP address, and 3) which communication protocols may be accepted.

A user connects to a web server (not shown) using a web browser using, for example, HyperText Transfer Protocol Secure (HTTPS) to communicate with a specific security proxy 301 and forwards encrypted data packets (step 501). It does not matter whether IPv4 or IPv6 is employed since layer 3 data packet processing processes the data packet at layer 3 and passes the data packet to layer 4. The web server authenticates the connection to the specific security proxy 301 using its stored security information such as user name, password and stored digital certificate, and forwards a request to the specific security proxy 301 for a security policy, such as an RBAC 421 configuration which indicates the device a user is authorized to access, what operations are authorized, an Intrusion Detection Profile (IDP) for the device, an access control 425 configuration and what to log to the data repository 405 (steps 503, 505). The security proxy 301 responds and forwards the current security policy configuration to the web server. The web server forwards the security policy to the user via the web browser (step 507). The user configures new security settings and downloads them to the web server (steps 509, 511).

Validating the new security policy means the downloaded security policy is enforced from that moment and the security proxy 301 writes the new security policy configuration to the data repository 405 (step 513). The user closes the connection (steps 515, 517).

According to a security proxy's 301 security policy configuration (its RBAC 421 and access control 425), the event logger 417 records predetermined events such as who accesses the security proxy's protected device and what command operation is performed to a data log and forwards event alarms to a predetermined HMI (PC or mail box). The event logger 417 also manages the event data log (for example, if the buffer is full, it stops recording new events to avoid memory overflow).

Figure 6:
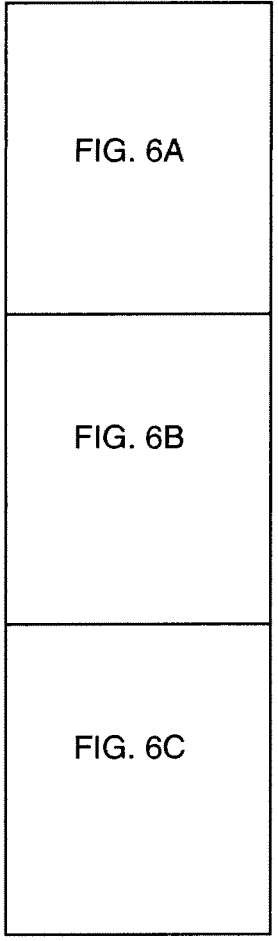
FIG. 6 is an exemplary inbound data packet processing method.
Figure 6A:
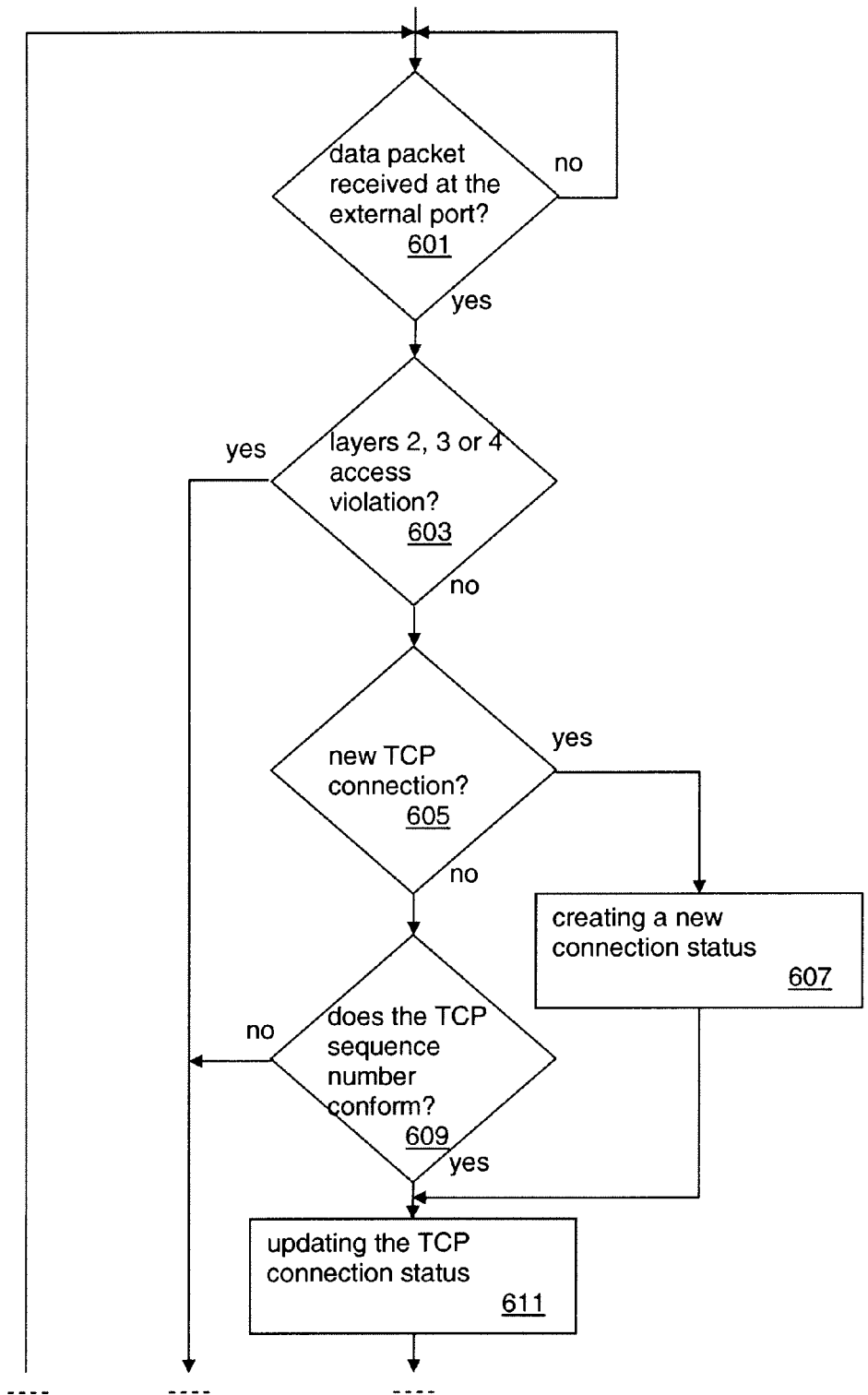
Figure 6B:
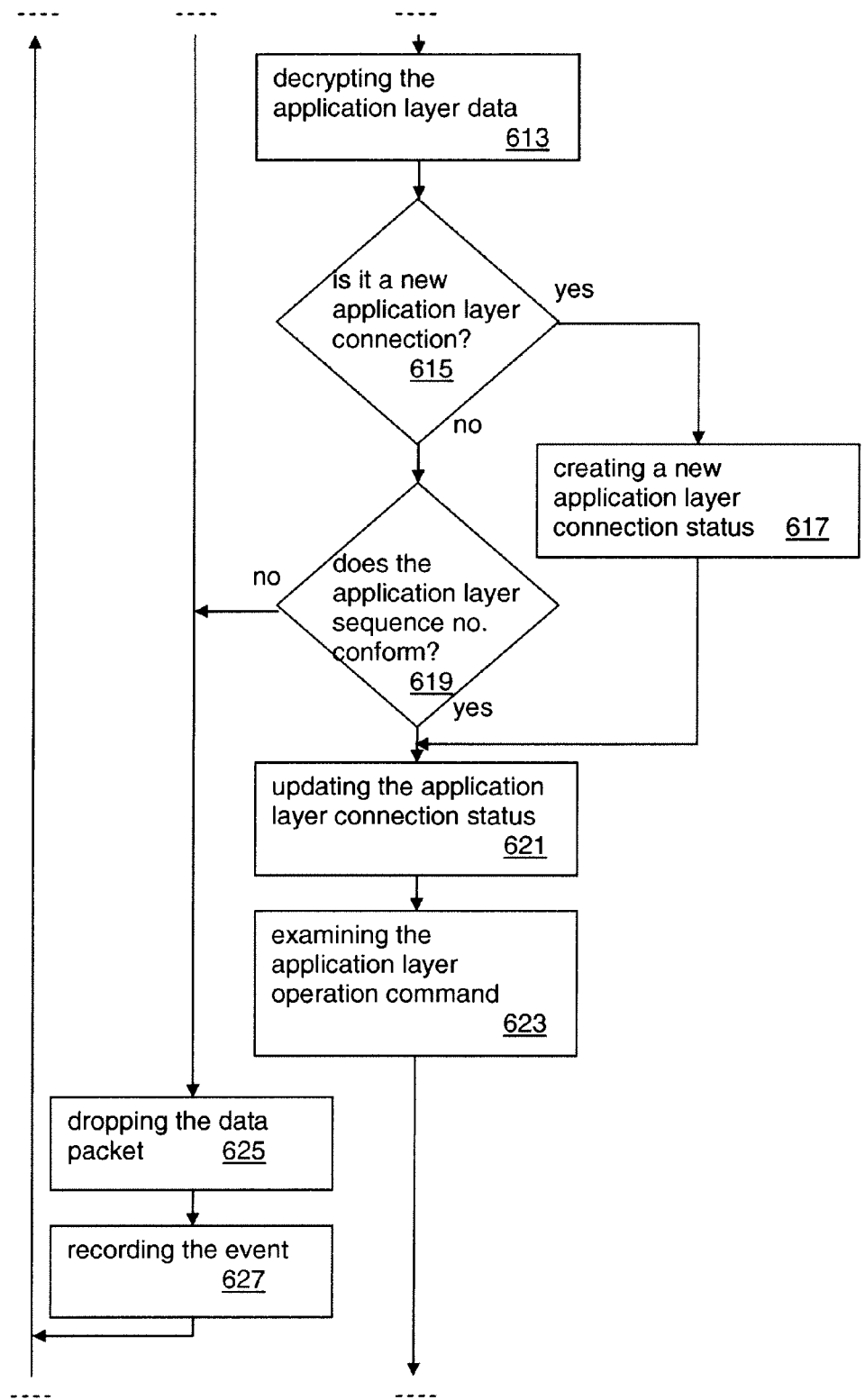
Figure 6C:
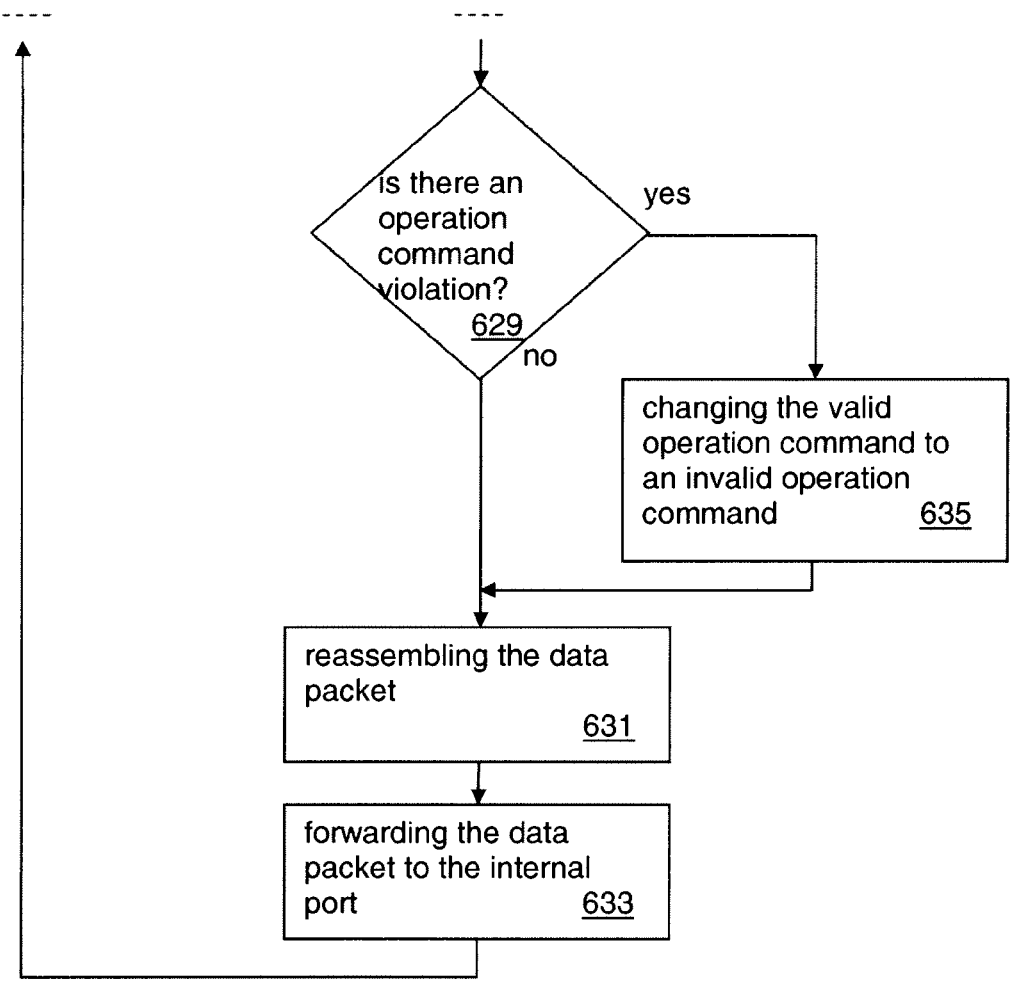

FIG. 6 shows an inbound data packet processing method. When a data packet containing an operation command such as open/trip a circuit breaker, is received at the external port 407 of a security proxy 301, the data packet processing 413 examines the headers of layers 2, 3 and 4 to check if the MAC source and destination addresses, the IP addresses and protocols, and the port numbers, sequence number and acknowledgement number, respectively, violate the lower layer access control 425 list (steps 601, 603). The data packet processing 413 checks if the layer 4 Transmission Control Protocol (TCP) sequence number and acknowledgement number conform to the TCP connection status, and updates the TCP connection status (steps 605, 609, 611). The TCP connection status describes the state of a TCP connection such as connecting, disconnecting, idle, and inbound/outbound sequence numbers and acknowledgement numbers. The TCP connection status, which is associated with a TCP connection (certain IP source address, IP destination address, source port, destination port and protocol number) is created, managed and removed by a security proxy 301. When a new TCP connection request is received, the security proxy 301 retrieves the tuple (IP source address, IP destination address, source port, destination port and protocol number) which does not conform to one existing in the security proxy 301, and creates a new TCP connection status for the connection request (step 607).

Data packet inspection using the layer 4 header TCP sequence and acknowledgement numbers can indicate if the data packet has suffered from a "TCP-session-hijack" type attack. If the lower layer security policies, such as a data packet from a device with an unauthorized IP address or MAC address, or a data packet whose destination port is an unopened port on a protected device (RTU 103) are violated by the inbound data packet, the inbound data packet is dropped and the event is recorded (steps 603, 609, 625, 627).

After the lower layers of the data packet are processed, the cryptography component 429 decrypts the application layer data into the communication protocol the device uses (step 613). After decryption, the decrypted application layer data is stored in the data repository 405.

If the destination (protected) device communicates over DNP3, the communication protocol is DNP3. The DNP3 component 423 receives the application layer data by polling. If the application layer data is a new application layer connection, the DNP3 component 423 creates a new connection status (steps 615, 617). A new DNP3 connection, which is specified by a master node number and a slave node number, always starts with a DNP3 connection request. For example, a user performs device troubleshooting when an alarm message is received at the control center 121. The user starts a new application connection to retrieve error messages and data from the event log 417. The connection status (disconnected, connecting, idle, and also the role of this connection—maintenance engineer, or operator, or system engineer, etc.) defined in the DNP3 standard may be used to prevent "DNP3-session-hijack" type attacks.

For each DNP3 connection, the security proxy 301 maintains and manages its status, such as connection, idle, master/slave, and sequence and acknowledgement numbers. If an inbound data packet is not a new application layer connection, the DNP3 component 423 checks if the layer 7 header sequence number of the DNP3 connection matches the sequence number it expects (step 615, 619). For example, if the sequence number of a master is 102, then it is expected that the next packet sent from the master possesses sequence number 102. If the DNP3 application layer connection conforms to the current connection status, which means its header sequence number and acknowledgement number are as expected by the security proxy 301, the DNP3 connection status is updated (step 621). For example, if the sequence number of a master is 102, then a packet, with sequence number 102 and length 66, from the master is received, the application status is updated—the sequence number is updated to 168, which means the next packet should posses sequence number 168. Otherwise, the data packet is dropped and the event is recorded (steps 619, 625, 627).

The application layer content component 419 examines the application layer data for the communication protocol (DNP3) operation command (step 623). The corresponding operation commands are obtained using the DNP3 specification. If there is no operation command violation with the RBAC 421, the DNP3 data is reassembled according to the DNP3 specification for the lower layer headers (steps 629, 631). If there is an operation command violation with the RBAC 421, the application layer data (operation command) is changed and the data packet is reassembled (steps 629, 635, 631). The reassembled data packet is forwarded to the internal port (step 633).

The application layer content component 419 reads the received application layer data operation command by polling, which is stored in the data repository 405, and compares it with the RBAC 421 list. The application layer content component 419 copies the operation from memory and writes it to the data repository 405 if the operation command is valid and is authorized for that user. For example, an operation command such as download new control logic, write data such as an over current setting, read a diagnostic message such as current, voltage, frequency and reactive power, etc. If the operation is valid for the protected device, but is not authorized for that user, the application layer content component 419 changes the received operation command and writes it to the data repository 405 if the operation is not allowed.

The DNP3 component 523 retrieves the intended operation command from the data repository 405 by polling and generates a DNP3 packet. The DNP3 component 523 writes the new DNP3 packet back to the data repository 405.

If a received application layer data operation command is not authorized for the user, and is dropped by the security proxy 301, the communicating party at the external port will repeatedly retransmit the data packet and since the data packet is continuously being dropped and no return reply is sent, the connection for the session will be disconnected. In order to avoid disconnecting the connection in the event of a non-authorized operation command (user mistake), an invalid operation command for the protected device is used to replace the valid, but non-authorized, command operation.

For example, there may be 20 binary outputs (B0 to B19) in the RTU 103, and the user is authorized to "read" a value from any one of them but is not authorized to "write" a value to any one of them. If the user sends a data packet which contains an application layer operation command to "write to B10," an invalid DNP3 command "write to B20" is generated and is substituted for the original non-authorized "write to B10" command. Upon receipt, the RTU 103 will reply back to the user with a message "invalid operation" and the DNP3 connection, between the user and RTU 103 is not disconnected. Typically, the communication connection is associated with certain IP addresses, port numbers, protocol number, and application layer station numbers.

Since the exposure point to hackers is at an external port, the communicating party connected to an internal port is trusted. An outbound data packet is encrypted before it is sent from an external port 407.

Figure 7:
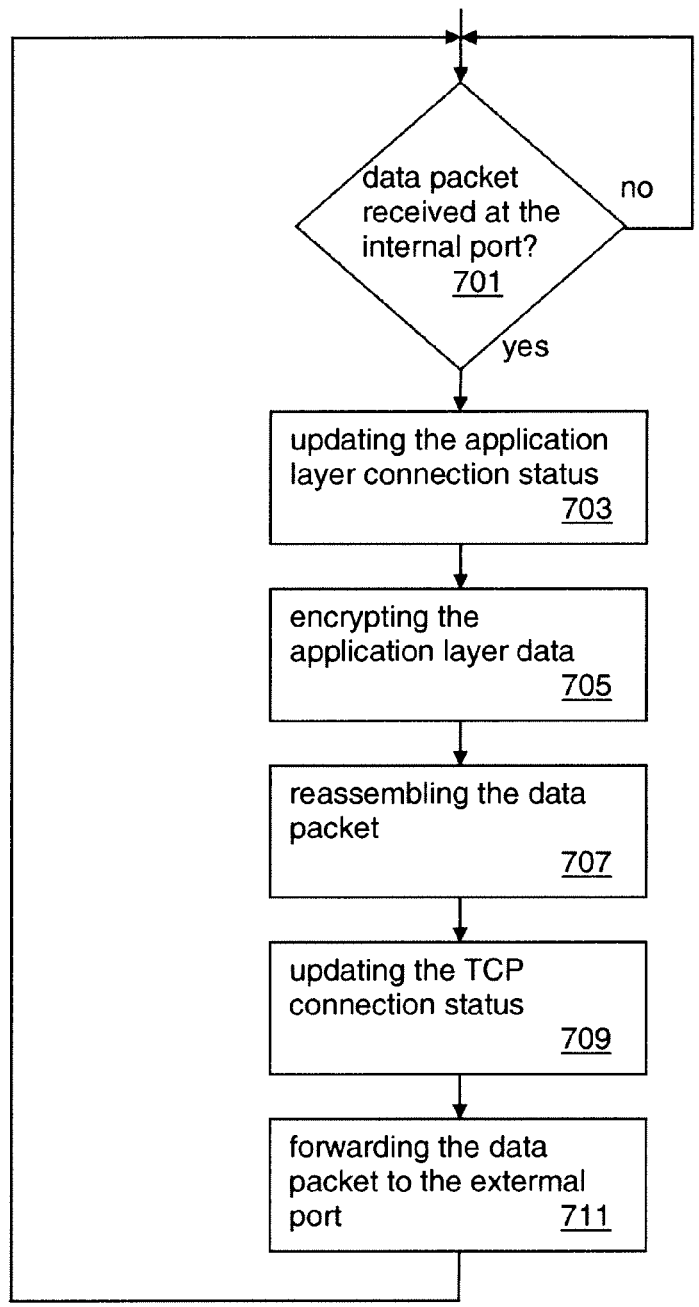
FIG. 7 is an exemplary outbound data packet processing method.

FIG. 7 shows an outbound data packet processing method. When a data packet is received at the security proxy 301 internal port 409, the data packet processing component 413 removes the headers from layers 2, 3 and 4 (steps 701, 703). The data packet processing component 413 encrypts the application layer data (DNP3 data) (step 705). The data packet processing component 413 reassembles the data packet by generating headers for layers 4, 3 and 2, since the application layer data (DNP3 data) is newly encrypted and the checksums for each lower layer header must be recalculated (steps 707). The TCP sequence number and acknowledgement number (connection status) is updated and the encrypted data packet is forwarded to the external port 407 (steps 709, 711).

Figure 8:
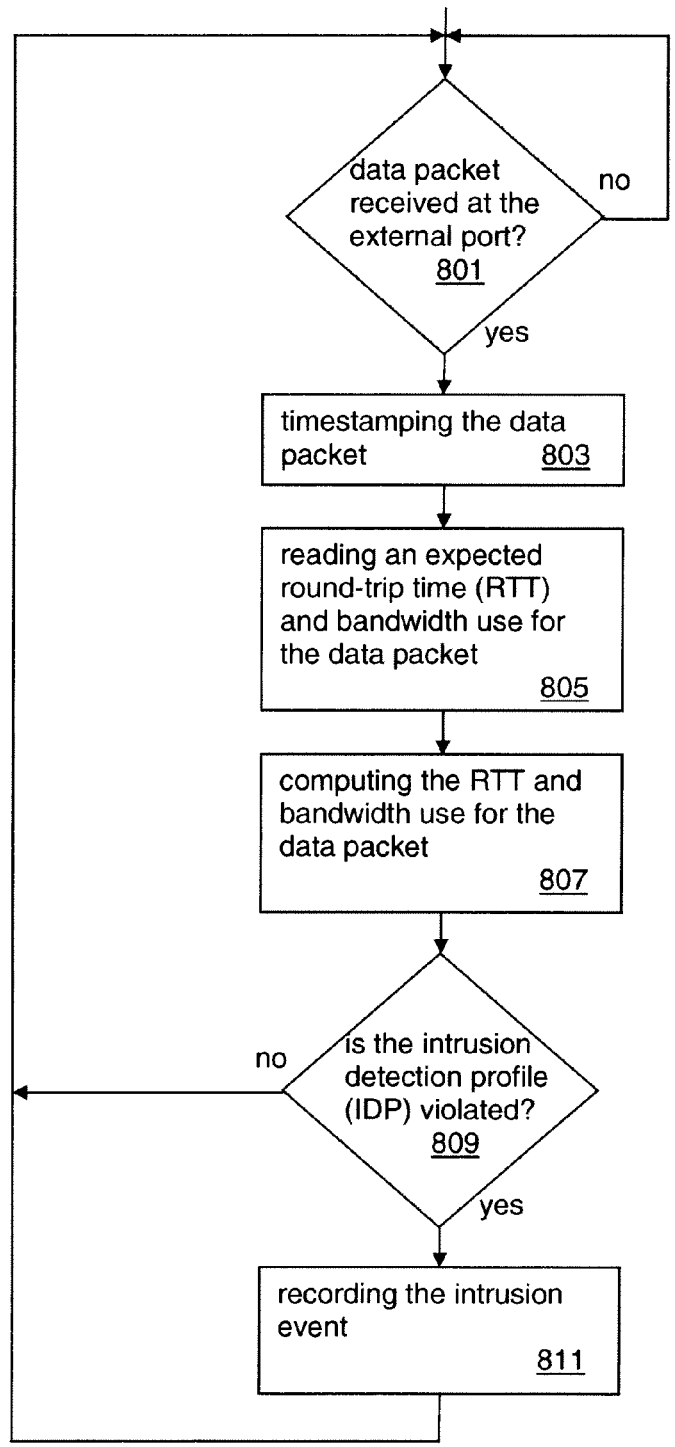
FIG. 8 is an exemplary intrusion detection processing method.

FIG. 8 shows an intrusion detection processing method. The intrusion detection component 427 timestamps each received, inbound data packet and reads its size (steps 801, 803). The intrusion detection component 427 then accesses an IDP which specifies an expected Round-Trip Time (RTT) range and bandwidth usage range for the connection between the user and protected device (step 805).

The intrusion detection component 427 calculates an RTT and bandwidth use for each received, inbound data packet (step 807). Since the TCP connection status is maintained by the security proxy 301, the RTT is computed as the time difference between a received, inbound data packet and its acknowledgement data packet. The bandwidth use is computed as the volume of data in the packet in bytes. If the data packet's RTT, or bandwidth use, is not within the IDP ranges, the intrusion detection component 427 writes the event to the data repository 405 (steps 809, 811).

In an automation system network, data packet delay and bandwidth are important for control functionalities. For example, an operation command from a user must be received at a substation RTU within a predetermined amount of time, otherwise, damage to power devices, such as large transformers may result. The allocated bandwidth has to be guaranteed in order to transmit a large volume of data such as current, voltage, phase and frequency for a substation. That is the reason RTT and bandwidth use is monitored. However, it is not easy to measure packet delay since it is hard to synchronize the system clocks of multiple devices. Therefore, RTT using connection-oriented protocols such as DNP3 and TCP is used to measure packet delay.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for protecting a substation device that receives operation commands over an Internet Protocol (IP) communications network comprising:
receiving an inbound data packet that contains an operation command for the device;
comparing the layer 2 header MAC addresses, IP addresses, port numbers and protocol number with an access control list;
responsive to at least one of the layer 2 header MAC addresses, IP addresses, port numbers and protocol number violating the access control list, dropping the data packet;
comparing the layer 3 header source address, destination address and protocol number with the access control list;
responsive to at least one of the layer 3 header source address, destination address and protocol number violating the access control list, dropping the data packet;
comparing the layer 4 header sequence number and acknowledgement number with a connection status;
responsive to the layer 4 sequence number or acknowledgement number not conforming with the connection status, dropping the data packet;
decrypting application layer data into a predetermined communication protocol;
comparing the application layer data sequence number with an expected application layer sequence number;
responsive to the application layer data sequence number not conforming with the expected application layer sequence number, dropping the data packet;
comparing the operation command with a Role-Based Access Control (RBAC) comprising:
responsive to the operation command being authorized by the RBAC, the operation command is reassembled into a data packet according to the application layer communication protocol; and
responsive to the operation command not being authorized by the RBAC, the operation command is changed to an invalid operation command for the device and reassembled into a data packet according to the application layer communication protocol;
timestamping the received, inbound data packet;

calculating a Round-Trip Time (RTT) for the received, inbound data packet, wherein the RTT is computed as the time difference between the received, inbound data packet and its subsequent acknowledgement packet;

reading an Intrusion Detection Profile (IDP), wherein the IDP specifies an RTT range for the inbound, received data packet's source port; and responsive to the inbound data packet's RTT not being within the IDP RTT range, generating an alarm event.

2. The method according to claim 1 wherein the predetermined application layer communication protocol is a Distributed Network Protocol 3 (DNP3) specification.

3. The method according to claim 1 wherein the predetermined application layer communication protocol is an International Electrotechnical Commission (IEC) 61850 specification.

4. The method according to claim 1 further comprising:
reading the size of the received, inbound data packet;
calculating a bandwidth usage for the received, inbound data packet, wherein the bandwidth usage is computed as the volume of data in the data packet in bytes;
reading an Intrusion Detection Profile (IDP), wherein the IDP specifies a bandwidth usage range for the received, inbound data packet's source port; and
responsive to the inbound data packet's bandwidth not being within the IDP bandwidth usage range, generating an alarm event.

5. The method according to claim 1 wherein the RBAC specifies authorized access to the device and authorized command operations for the device.

6. A non-transitory computer-readable medium having stored thereon computer readable instructions for protecting a substation device that receives operation commands over an Internet Protocol (IP) communications network, wherein execution of the computer readable instructions by a processor causes the processor to perform operations comprising:
receiving an inbound data packet that contains an operation command for the device;
comparing the layer 2 header MAC addresses, IP addresses, port numbers and protocol number with an access control list;
responsive to at least one of the layer 2 header MAC addresses, IP addresses, port numbers and protocol number violating the access control list, dropping the data packet;
comparing the layer 3 header source address, destination address and protocol number with the access control list;
responsive to at least one of the layer 3 header source address, destination address and protocol number violating the access control list, dropping the data packet;
comparing the layer 4 header sequence number and acknowledgement number with a connection status;
responsive to the layer 4 sequence number or acknowledgement number not conforming with the connection status, dropping the data packet;
decrypting application layer data into a predetermined communication protocol;
comparing the application layer data sequence number with an expected application layer sequence number;
responsive to the application layer data sequence number not conforming with the expected application layer sequence number, dropping the data packet;
comparing the operation command with a Role-Based Access Control (RBAC) comprising:
responsive to the operation command being authorized by the RBAC, the operation command is reassembled into a data packet according to the application layer communication protocol; and
responsive to the operation command not being authorized by the RBAC, the operation command is changed to an invalid operation command for the device and reassembled into a data packet according to the application layer communication protocol;
timestamping the received, inbound data packet;
calculating a Round-Trip Time (RTT) for the received, inbound data packet, wherein the RTT is computed as the time difference between the received, inbound data packet and its subsequent acknowledgement packet;
reading an Intrusion Detection Profile (IDP), wherein the IDP specifies an RTT range for the inbound, received data packet's source port; and
responsive to the inbound data packet's RTT not being within the IDP RTT range, generating an alarm event.

7. The non-transitory computer-readable medium according to claim 6 wherein the predetermined application layer communication protocol is a Distributed Network Protocol 3 (DNP3) specification.

8. The non-transitory computer-readable medium according to claim 6 wherein the predetermined application layer communication protocol is an International Electrotechnical Commission (IEC) 61850 specification.

9. The non-transitory computer-readable medium according to claim 6 wherein the operations further comprise:
reading the size of the received, inbound data packet;
calculating a bandwidth usage for the received, inbound data packet, wherein the bandwidth usage is computed as the volume of data in the data packet in bytes;
reading an Intrusion Detection Profile (IDP), wherein the IDP specifies a bandwidth usage range for the received, inbound data packet's source port; and
responsive to the inbound data packet's bandwidth not being within the IDP bandwidth usage range, generating an alarm event.

10. The non-transitory computer-readable medium according to claim 6 wherein the RBAC specifies authorized access to the device and authorized command operations for the device.

11. A security proxy for protecting a substation device that receives operation commands over an Internet Protocol (IP) communications network, the security proxy comprising an external port coupled to the communications network, an internal port coupled to the substation device, a processor and a non-transitory computer-readable medium having stored thereon computer readable instructions, wherein execution of the computer readable instructions by the processor causes the security proxy to perform operations comprising:
receiving via the external port an inbound data packet that contains an operation command for the device;
comparing the layer 2 header MAC addresses, IP addresses, port numbers and protocol number with an access control list;
responsive to at least one of the layer 2 header MAC addresses, IP addresses, port numbers and protocol number violating the access control list, dropping the data packet;
comparing the layer 3 header source address, destination address and protocol number with the access control list;
responsive to at least one of the layer 3 header source address, destination address and protocol number violating the access control list, dropping the data packet;
comparing the layer 4 header sequence number and acknowledgement number with a connection status;

responsive to the layer 4 sequence number or acknowledgement number not conforming with the connection status, dropping the data packet;

decrypting application layer data into a predetermined communication protocol;

comparing the application layer data sequence number with an expected application layer sequence number;

responsive to the application layer data sequence number not conforming with the expected application layer sequence number, dropping the data packet;

comparing the operation command with a Role-Based Access Control (RBAC) comprising:

responsive to the operation command being authorized by the RBAC, the operation command is reassembled into a data packet according to the application layer communication protocol; and responsive to the operation command not being authorized by the RBAC, the operation command is changed to an invalid operation command for the device and reassembled into a data packet according to the application layer communication protocol;

timestamping the received, inbound data packet;

calculating a Round-Trip Time (RTT) for the received, inbound data packet, wherein the RTT is computed as the time difference between the received, inbound data packet and its subsequent acknowledgement packet;

reading an Intrusion Detection Profile (IDP), wherein the IDP specifies an RTT range for the inbound, received data packet's source port; and responsive to the inbound data packet's RTT not being within the IDP RTT range, generating an alarm event.

12. The security proxy according to claim 11 wherein the predetermined application layer communication protocol is a Distributed Network Protocol 3 (DNP3) specification.

13. The security proxy according to claim 11 wherein the predetermined application layer communication protocol is an International Electrotechnical Commission (IEC) 61850 specification.

14. The security proxy according to claim 11 wherein the operations further comprise:

reading the size of the received, inbound data packet;

calculating a bandwidth usage for the received, inbound data packet, wherein the bandwidth usage is computed as the volume of data in the data packet in bytes;

reading an Intrusion Detection Profile (IDP), wherein the IDP specifies a bandwidth usage range for the received, inbound data packet's source port; and responsive to the inbound data packet's bandwidth not being within the IDP bandwidth usage range, generating an alarm event.

15. The security proxy according to claim 11 wherein the RBAC specifies authorized access to the device and authorized command operations for the device.

* * * * *